United States Patent Office.

WILLIAM F. SEMPLE, OF MOUNT VERNON, OHIO.

Letters Patent No. 98,304, dated December 28, 1869.

IMPROVED CHEWING-GUM.

The Schedule referred to in these Letters Patent and making part of the same.

*To all whom it may concern:*

Be it known that I, WILLIAM F. SEMPLE, of Mount Vernon, county of Knox, and State of Ohio, have invented a new and improved Chewing-Gum; and I do hereby declare that the following is a full, clear, and exact description of the same.

The nature of my invention consists in compounding with rubber, in any proportions, other suitable substances, so as to form not only an agreeable chewing-gum, but also, that from the scouring-properties of the same, it will subserve the purpose of a dentifrice.

It is well known that rubber itself is too hard to be used as a chewing-gum, but in combination with non-adhesive earths may be rendered capable of kneading into any shape under the teeth.

In the manufacture of this improved chewing-gum, no vulcanizing-process is employed. It is produced by simply dissolving the rubber in naphtha and alcohol, and when of the consistence of jelly, mixing with it prepared chalk, powdered licorice-root, or any other suitable material, in the desired proportions, and subsequently evaporating the solvents.

I do not, however, confine myself to this method alone for the manufacture of the gum. For commercial purposes, other equally effectual processes may be used for the uniting of the rubber with suitable substances.

Instead of the solvents named, any other that will soften the rubber, without being offensive, may be employed, such as paraffine, spermaceti, wax, gums, resins, and the like. Any of the materials commonly used for the manufacture of dentifrices may be combined with the rubber, such as orris-root, myrrh, licorice-root, sugar, barytes, charcoal, &c.

By the term "rubber," I wish to include the allied vegetable gums, which are ordinarily known as the equivalents of caoutchouc.

Having thus fully described my invention,
What I claim as new, and desire to secure by Letters Patent, is—

The combination of rubber with other articles, in any proportions adapted to the formation of an acceptable chewing-gum.

W. F. SEMPLE.

Witnesses:
   C. MAGERS,
   T. V. PARKE.